UNITED STATES PATENT OFFICE.

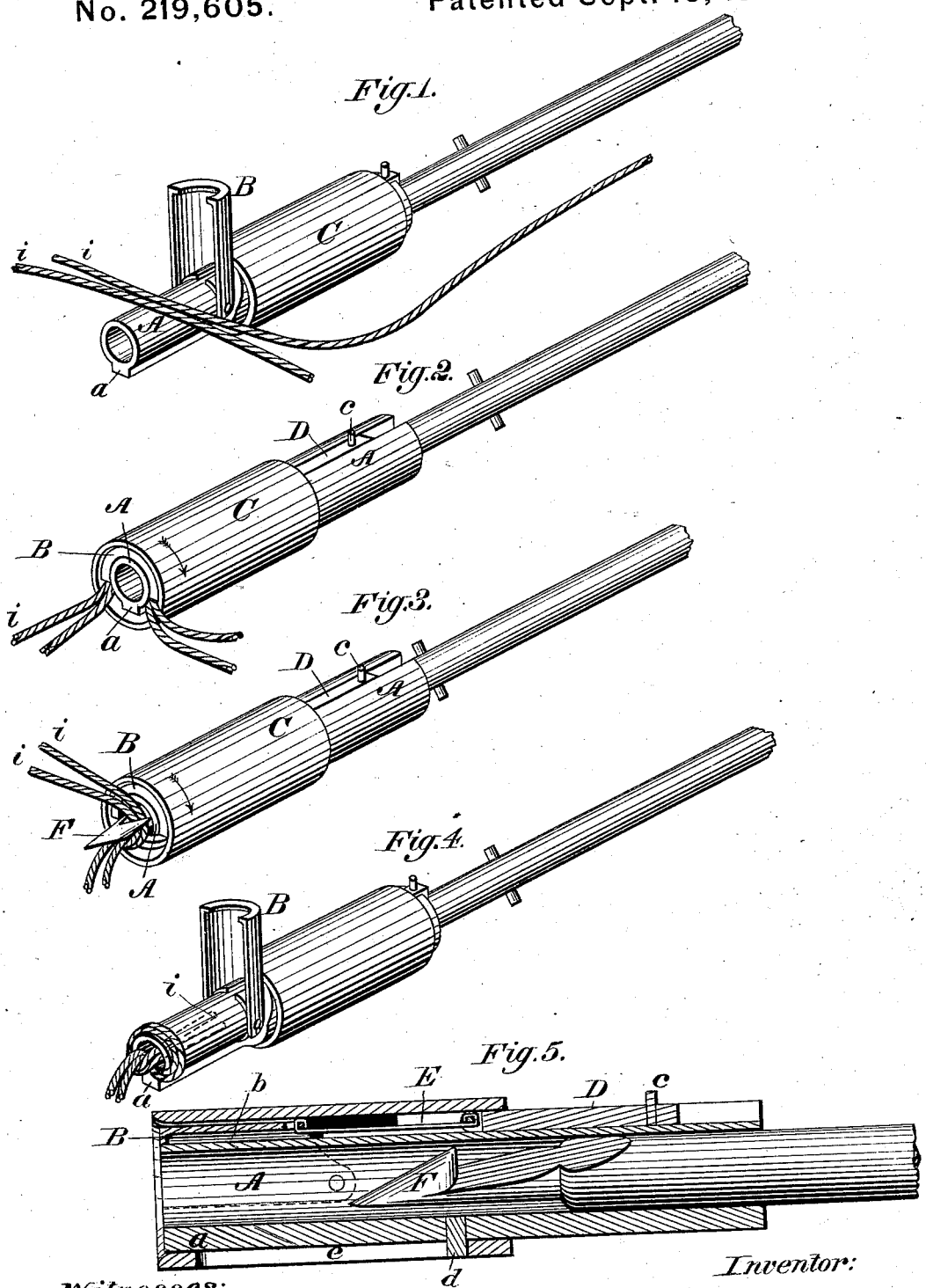

CHARLES L. TRAVIS, OF MINNEAPOLIS, MINNESOTA.

IMPROVEMENT IN GRAIN-BINDERS.

Specification forming part of Letters Patent No. 219,605, dated September 16, 1879; application filed June 18, 1879.

*To all whom it may concern:*

Be it known that I, CHARLES L. TRAVIS, of Minneapolis, in the county of Hennepin and State of Minnesota, have invented certain Improvements in Grain-Binders, of which the following is a specification.

My invention relates to that class of devices in which a rotary device is employed to twist the cord into a loop, and a hook employed to draw the ends through the loop in order to complete the knot; and it consists in a peculiar construction and combination of parts, as hereinafter specified.

Figures 1, 2, 3, and 4 represent perspective views of my device during the different steps in the formation of a knot; Fig. 5, a longitudinal central section of the device.

A represents a rotary metal tube having its forward end shouldered down or reduced in size on the outside, with the exception of a rib, $a$, on the under side, the tube being intended to serve as a mandrel around which to wind the cord in order to form a loop. B represents a clamping-jaw of semicircular form in cross-section, hinged at its rear end to the tube A in such manner as to close down at will upon the forward reduced end of the tube in order to hold the cord thereon. The clamp is cut away on the inside in the manner shown, so that, while it fits closely to the tube at the forward end, there remains a space, $b$, between the two to receive the cord. The clamp is opened and closed and fastened shut by means of an external sleeve or tube, C, mounted on the outside of the tube A, and a sliding key, D, mounted in a longitudinal groove in the tube A, and connected by a link, E, to the rear end of the clamp.

The sliding key is provided at its rear end with a stud, $c$, to be acted upon by the sleeve, and the latter is limited in its longitudinal motion and caused to rotate with the main tube and clamp by means of a pin, $d$, passing through a slot, $e$, in the sleeve and seated in the tube A, as shown in Fig. 5.

When the sleeve slides back from over the clamp it strikes the stud $c$, and thereby moves the key, which causes the link to tip the clamp upward from the tube A, and then, as the sleeve slides forward again, it acts against and closes the clamp, and passes over and around it, so as to hold it down firmly on the tube A, as shown in Figs. 2, 3, and 5.

Within the main tube A there is a longitudinally-sliding hook, F, which may or may not partake of the rotary motion of the tube, and which is arranged to be protruded at the proper times through and beyond the end of the tube, as shown in Fig. 3.

The device being constructed as above described, and connected with operating mechanism of any suitable construction, performs the operation of tying a knot in the following manner: The hook being drawn back within the tube A, and the sleeve C being drawn back so as to hold the clamp B open, as shown in Fig. 1, the parts remain at rest while the two ends $i\ i$ of the cord or band are laid across the tube A, as shown in the same figure. The sleeve C then slides forward and closes and fastens the clamp down firmly over both ends of the cord, binding them firmly around the tube within the clamp, and at the same time pushing them forward to the front end of the tube, as shown in Fig. 2, the cords entering, as there shown, on one side of the center and emerging on the opposite side.

The tube, with the clamp and sleeve, next rotate to the left, as indicated by the arrow, about three-fourths of a revolution, the effect of which is to twist the cord, which will be held by suitable guides or clamp outside of the tying devices, into a loop, and to place the ends $i\ i$ across the loop and the mouth of the tube A, as shown in Fig. 3. The hook then advances, and, engaging with the ends $i\ i$, recedes and draws them inward into the tube and through the loop, as shown by dotted lines in Fig. 4. The sleeve then recedes and the clamp opens, as shown in Fig. 4, leaving the tied ends free to be drawn from the device.

The manner of operating the clamp may, of course, be modified, and any suitable devices employed for presenting the cord, holding it while being tied, and tightening the knot after being tied.

I do not claim herein, broadly, the combination of a tube, an internal hook, and an exterior clamping-jaw mounted upon the tube, nor the combination of an external clamping-jaw pivoted upon and turning with the tube, as such invention and claims form the subject of an earlier application of my own.

Having thus described my invention, what I claim is—

1. The combination, in a knot-tying device, of the tube A, jaw B, and sleeve C, arranged to close the jaw and force the cord forward upon the tube, substantially as shown.

2. The combination of the tube A, hook F, jaw B, sleeve C, key D, and link E.

3. The combination, in a cord-tier, of a rotary tube and a semicircular external clamp adapted to confine the cord between the two.

4. In a knot-tying mechanism, the combination, with a rotary tube and an external clamping device, of an external slide arranged to force the cord forward to the front end of the tube, and also to operate the clamping device.

CHARLES L. TRAVIS.

Witnesses:
 WILLIAM P. ROBERTS,
 C. H. BURTON.